(12) United States Patent
Amato (10) Patent No.: US 11,556,466 B2
(45) Date of Patent: *Jan. 17, 2023

(54) LOGICAL-TO-PHYSICAL DATA STRUCTURES

(71) Applicant: Micron Technology, Inc., Boise, ID (US)

(72) Inventor: Paolo Amato, Treviglio (IT)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/197,660

(22) Filed: Mar. 10, 2021

(65) Prior Publication Data
US 2021/0191855 A1    Jun. 24, 2021

Related U.S. Application Data

(62) Division of application No. 15/994,669, filed on May 31, 2018, now Pat. No. 10,970,205.

(51) Int. Cl.
*G06F 12/02* (2006.01)
*G06F 12/1018* (2016.01)

(52) U.S. Cl.
CPC ...... *G06F 12/0246* (2013.01); *G06F 12/1018* (2013.01); *G06F 2212/7201* (2013.01)

(58) Field of Classification Search
CPC ............. G06F 12/0246; G06F 12/1018; G06F 2212/7201
See application file for complete search history.

(56) References Cited

U.S. PATENT DOCUMENTS

| 8,219,776 | B2 | 7/2012 | Forhan et al. |
| 9,104,678 | B1 | 8/2015 | Nemes et al. |
| 9,483,181 | B2 | 11/2016 | Kim et al. |
| 2006/0143168 | A1* | 6/2006 | Rossmann .......... G06F 16/9014 |
| 2008/0005530 | A1 | 1/2008 | Nakano |
| 2009/0106486 | A1 | 4/2009 | Kim et al. |
| 2013/0275656 | A1 | 10/2013 | Talagala et al. |
| 2014/0195725 | A1 | 7/2014 | Bennett |

(Continued)

FOREIGN PATENT DOCUMENTS

| KR | 10-2016-0071703 A | 6/2016 |
| KR | 10-2018-0019419 A | 2/2018 |
| KR | 10-2018-0054432 A | 5/2018 |

OTHER PUBLICATIONS

International Search Report and Written Opinion from related International Application No. PCT/US2019/024244, dated Jul. 11, 2019, 11 pages.

(Continued)

*Primary Examiner* — Tasnima Matin
(74) *Attorney, Agent, or Firm* — Brooks, Cameron & Huebsch, PLLC (57) ABSTRACT

An example apparatus comprises a controller coupled to a non-volatile memory (NVM) device. The controller may be configured to cause a logical block address (LBA) to be stored in a first logical-to-physical (L2P) data structure in the NVM device and a physical block address (PBA) to be stored in a second L2P data structure in the NVM device The first L2P data structure and the second L2P data structure may have a same size associated therewith.

20 Claims, 4 Drawing Sheets

(56) References Cited

U.S. PATENT DOCUMENTS

| | | | |
|---|---|---|---|
| 2014/0325115 A1* | 10/2014 | Ramsundar | G06F 3/0688 |
| | | | 711/163 |
| 2016/0110292 A1 | 4/2016 | Choi | |
| 2016/0246530 A1 | 8/2016 | Mylavarapu | |
| 2016/0364142 A1* | 12/2016 | Kanno | G06F 3/061 |
| 2017/0024153 A1 | 1/2017 | Yeh | |
| 2017/0139594 A1 | 5/2017 | Ahn et al. | |
| 2017/0262192 A1 | 9/2017 | Aga | |
| 2018/0090184 A1 | 3/2018 | Lee | |
| 2018/0113810 A1 | 4/2018 | Simionescu | |
| 2018/0136865 A1 | 5/2018 | Erlihson et al. | |
| 2019/0129856 A1 | 5/2019 | Jean | |

OTHER PUBLICATIONS

Extended European Search Report from related European Patent Application No. 19811868.9, dated Jan. 31, 2022, 13 pages.

Notice of Rejection Ground from related Japanese Patent Application No. 2020-566796, dated Feb. 1, 2022, 7 pages.

Internet Citation, "Hash Table", Mar. 23, 2015, Retrieved from the Internet: URL: https://en.wikipedia.org/w/index.php?title=Hash_table &oldid=653140916, 18 pages.

Notice of Preliminary Rejection from related Korean Patent Application No. 10-2020-7037664, dated Jun. 13, 2022, 10 pages.

* cited by examiner

LBA

| INDEX | STEP 0 | STEP 1 | STEP 2 | STEP 3 | STEP 4 |
|---|---|---|---|---|---|
| 0 |  | 4 | 4 | 4 | 4 |
| 1 |  |  |  |  |  |
| 2 |  |  |  |  |  |
| 3 |  |  |  |  | 4 |
| 4 | 2 | 2 | 2 | 2 | 2 |
| 5 |  |  |  |  |  |
| 6 |  |  | 5 | 5 | 5 |
| 7 |  |  |  |  |  |

PBA

| INDEX | STEP 0 | STEP 1 | STEP 2 | STEP 3 | STEP 4 |
|---|---|---|---|---|---|
| 0 |  | 1 | 1 | 1 | 4 |
| 1 |  |  |  |  |  |
| 2 |  |  |  |  |  |
| 3 |  |  |  |  | 1 |
| 4 | 0 | 0 | 0 | 3 | 3 |
| 5 |  |  |  |  |  |
| 6 |  |  | 2 | 2 | 2 |
| 7 |  |  |  |  |  |
|  |  |  |  | UPDATE | COLLISION |

LOGICAL-TO-PHYSICAL DATA STRUCTURES

PRIORITY INFORMATION

This application is a Divisional of U.S. application Ser. No. 15/994,669, filed on May 31, 2018, the contents of which are incorporated herein by reference in its entirety.

TECHNICAL FIELD

The present disclosure relates generally to semiconductor memory and methods, and more particularly, to apparatuses and methods related to logical-to-physical data structures.

BACKGROUND

Memory devices are typically provided as internal, semiconductor, integrated circuits in computing systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, and NOR flash memory, among others.

Data may be stored according to logical block addresses (LBAs) and physical block addresses (PBAs). The mapping between the LBAs and the PBAs may be referred to as logical-to-physical (L2P) mapping. The mapping between the LBAs and the PBAs may be stored in a tree structure. A tree structure for storing L2P data may include a P-level L2P table, where P is a non-zero integer. A simple example in accordance with some approaches may include a 2-level L2P table. The first-level table may contain addresses of the second-level tables, which may be referred to as "segments." In some approaches, each segment may include an L2P table for a small range of consecutive LBAs (e.g., 1024 LBAs).

DETAILED DESCRIPTION

The present disclosure includes apparatuses and methods related to logical-to-physical data structures. An example apparatus comprises a controller coupled to a non-volatile memory (NVM) device. The controller may be configured to cause a logical block address (LBA) to be stored in a first logical-to-physical (L2P) data structure in the NVM device and a physical block address (PBA) to be stored in a second L2P data structure in the NVM device. The first L2P data structure and the second L2P data structure may have a same size associated therewith.

Computing systems such as personal computers, laptops, tablets, phablets, smartphones, Internet-of-Things (IoT) enabled devices, etc., may include one more memory devices (e.g., memory resources) to store data and/or instructions associated with the computing system. As used herein, "IoT enabled devices" include physical devices, vehicles, home appliances, and other devices embedded with electronics, software, sensors, actuators, and/or network connectivity which enables such objects to connect and exchange data. Examples of IoT enabled devices include wearable technologies, smart home devices, intelligent shopping systems, and monitoring devices, among other cyber-physical systems. In addition, computing systems may include one or more processing resources to execute system software such an operating system to provide common services for applications running on the computing system. Examples of operating systems include LINUX®, UNIX®, WINDOWS®, etc.

During operation, the computing system may store data (e.g., commands, firmware, software, computer code, metacode, framework files, etc.) in one or more memory devices. Such memory devices may be volatile or non-volatile (e.g., persistent). Examples of non-volatile memory (NVM) devices may include persistent flash memory resources such as NAND flash, NOR flash, etc., as well as emerging memory devices. Emerging memory (EM) technologies may include phase-change memory (PCM), magnetoresistive random access memory (MRAM), resistive random-access memory (ReRAM), ferroelectric RAM (FeRAM), and/or 3D XPoint memory, which may improve memory related latencies over other memory technologies. Volatile memory devices may include memory devices that require power to maintain stored information. Examples of volatile memory devices include dynamic random-access memory (DRAM) and static random-access memory (SRAM), among others.

The data stored by the memory device(s) may reside in a physical location of the memory device(s). The physical location (e.g., a physical block address) in which the data is stored may be mapped to a logical block address (LBA). The logical block address may be stored in a data structure and may be invoked to access the physical block address (PBA) in which the data is stored. For example, in order to access (e.g., read, write, erase, etc.) the data, the LBA may be invoked, which, in turn, directs the computing system to the PBA. As used herein, a "data structure" refers to a specialized format for organizing and/or storing data, which may or may not be organized in rows and columns. Examples of data structures include arrays, files, records, tables, trees, linked lists, hash tables, etc.

Logical block addressing is a scheme that can be used by a host for identifying a logical sector of data. For example, each logical sector can correspond to a unique logical block address (LBA). Additionally, an LBA may also correspond to a physical address. A logical sector of data can be a number of bytes of data (e.g., 256 bytes, 512 bytes, or 1,024 bytes). However, embodiments are not limited to these examples.

The mapping between the LBAs and the PBAs may be stored in a logical-to-physical (L2P) data structure (e.g., a L2P address data structure). In some approaches, L2P data structures are arranged in a tree structure. An example tree structure for storing an L2P data structure in accordance with some approaches may include a P-level L2P table, where P is a non-zero integer. A simple example in accordance with some approaches may include a 2-level L2P table. The first-level table may contain addresses of the second-level tables, which may be referred to as "segments." In some approaches, each segment may include an L2P table for a small range of consecutive LBAs (e.g., 1024 LBAs).

In some approaches, a tree structured L2P data structure as described above is utilized to simplify a search for a given LBA during operation of the computing device. Further, in some approaches, a tree structured L2P data structure as described above is utilized to minimize a size associated with the first-level table. For example, if a size associated with the first-level table is kept within a certain size threshold, it may be possible to store the first-level table in an SRAM and/or DRAM portion of a storage controller of the computing system.

However, approaches in which a tree structured L2P data structure are used may suffer from various shortcomings. For example, approaches using a tree structured L2P data structure utilize additional levels in the tree as the storage density of a memory device is increased. For example, as the storage density of the memory device increases, the number of levels in the tree structured L2P data structure may correspondingly increase. In some approaches, this may result in longer delays in L2P lookups and/or translations. Further, as the number of levels of the tree increases, the complexity of management (e.g., the complexity of a memory management scheme) also increases. The increase in delay times and/or the increase in the complexity of management may correspond to changes to the L2P table being propagated across each level of the tree.

In contrast, embodiments herein describe L2P table structures that may be used in applications in which a non-volatile memory device (e.g., an emerging NVM device) and a flash memory device (e.g., a NAND memory device) are provided as portions of a memory device. In some embodiments, the L2P data structures described herein may include L2P mapping tables. A first L2P mapping table may include logical block addresses and a second L2P mapping table may include physical block addresses. In some embodiments, the first L2P mapping table (e.g., the L2P mapping table including the logical block addresses) and the second L2P mapping table (e.g., the L2P mapping table including the physical block addresses) may be the same size (e.g., they may include a same number of rows and a same number of columns).

In some embodiments, the first L2P mapping table may be accessed using a plurality of hash functions (e.g., two hash functions). The index located in the first L2P mapping table using the hash functions may then be used to locate a physical location of a corresponding physical block address in the second L2P mapping table. In some embodiments, subsequent to locating the physical location of the corresponding physical block address in the second L2P mapping table, a physical block address may be written to, or read from, the physical location in the second L2P mapping table.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, designators such as "N," etc., particularly with respect to reference numerals in the drawings, indicate that a number of the particular feature so designated can be included. As used herein, "a number of" a particular thing refers to one or more of such things (e.g., a number of memory arrays can refer to one or more memory arrays). A "plurality of" is intended to refer to more than one of such things.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

Figure 1:
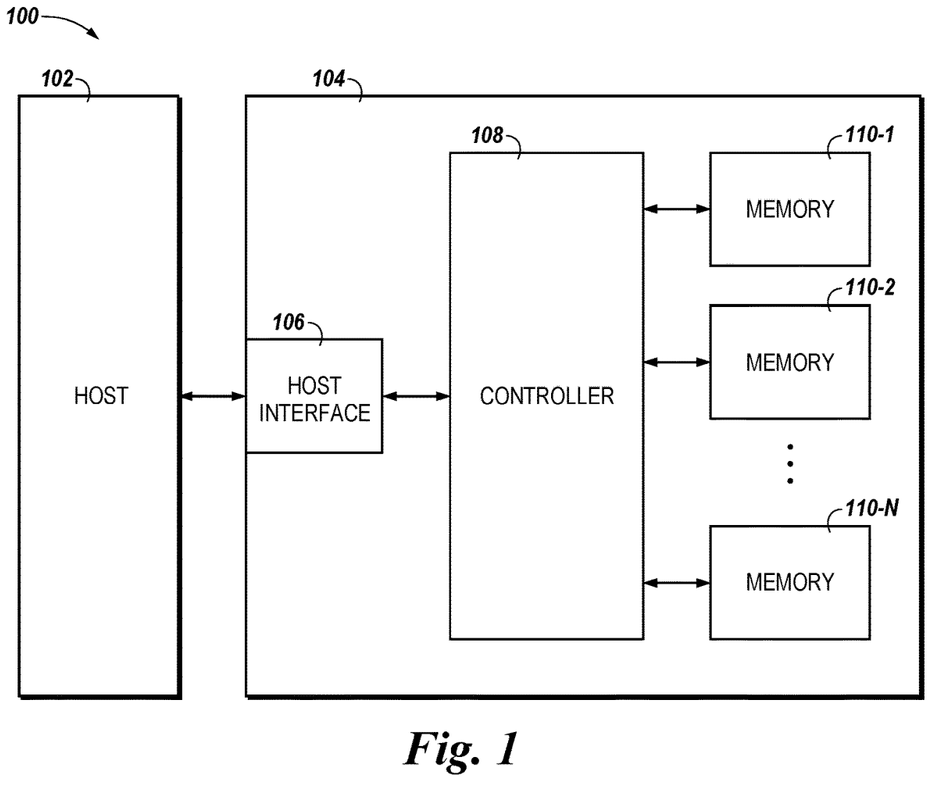
FIG. 1 is a functional block diagram of an apparatus in the form of a computing system comprising a memory system in accordance with a number of embodiments of the present disclosure.

FIG. 1 is a functional block diagram of an apparatus in the form of a computing system 100 comprising a memory system 104 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example.

Memory system 104 can be, for example, a solid state drive (SSD). In the embodiment illustrated in FIG. 1, memory system 104 includes a host interface 106, a memory (e.g., a number of memory devices 110-1, 110-2, ..., 110-N) (e.g., solid state memory devices), and a controller 108 (e.g., an SSD controller) coupled to physical host interface 106 and memory devices 110-1, 110-2, ..., 110-N.

Memory devices 110-1, 110-2, ..., 110-N can include, for example, a number of non-volatile memory arrays (e.g., arrays of non-volatile memory cells). For instance, memory devices 110-1, 110-2, ..., 110-N can include a number of non-volatile memory arrays such as emerging memory arrays and/or flash memory arrays, as described in more detail in connection with FIG. 2, herein.

In some embodiments, the memory devices 110-1, ..., 110-N can include a number of arrays of memory cells (e.g., non-volatile memory cells). The arrays can be flash arrays with a NAND architecture, for example. However, embodiments are not limited to a particular type of memory array or array architecture. The memory cells can be grouped, for instance, into a number of blocks including a number of physical pages of memory cells. In a number of embodiments, a block refers to a group of memory cells that are erased together as a unit. A number of blocks can be included in a plane of memory cells and an array can include a number of planes. As one example, a memory device may be configured to store 8 KB (kilobytes) of user data per page, 128 pages of user data per block, 2048 blocks per plane, and 16 planes per device.

In operation, data can be written to and/or read from a memory device of a memory system (e.g., memory devices 110-1, ..., 110-N of memory system 104) as a page of data, for example. As such, a page of data can be referred to as a data transfer size of the memory system. Data can be transferred to/from a host 102) in data segments referred to as sectors (e.g., host sectors). As such, a sector of data can be referred to as a data transfer size of the host. In some embodiments, NAND blocks may be referred to as erase blocks, with blocks being a unit of erasure and pages being a measure of reads and/or writes.

Host interface 106 can be used to communicate information between memory system 104 and another device such as a host 102. Host 102 can include a memory access device (e.g., a processor). As used herein, "a processor" can intend a number of processors, such as a parallel processing system, a number of coprocessors, etc. Example hosts can include personal laptop computers, desktop computers, digital cameras, digital recording and playback devices, mobile (e.g., smart) phones, PDAs, memory card readers, interface hubs, IoT enabled devices, and the like. Host 102 can include a system motherboard and/or backplane and can include a number of processing resources (e.g., one or more processors, microprocessors, etc.). The system 100 can include separate integrated circuits or both the host 102 and the memory system 104 can be on the same integrated circuit. The system 100 can be, for instance, a server system and/or a high performance computing (HPC) system and/or a portion thereof.

For clarity, the system 100 has been simplified to focus on features with particular relevance to the present disclosure. The memory system 104 can include one or memory resources such as a DRAM array (e.g., a 2T2C DRAM array, a 3T DRAM array, etc.), FeRAM, SRAM array, STT RAM array, PCRAM array, TRAM array, RRAIVI array, NAND flash array, 3D Xpoint memory, NOR flash array, and/or a storage sub-system that includes a controller, a 3D Xpoint memory portion and a NAND flash portion, for instance.

Host interface 106 can be in the form of a standardized physical interface. For example, when memory system 104 is used for information storage in computing system 100, host interface 106 can be a serial advanced technology attachment (SATA) physical interface, a peripheral component interconnect express (PCIe) physical interface, or a universal serial bus (USB) physical interface, among other physical connectors and/or interfaces. In general, however, host interface 106 can provide an interface for passing control, address, information (e.g., data), and other signals between memory system 104 and a host (e.g., host 102) having compatible receptors for host interface 106.

Controller 108 can include, for example, control circuitry and/or logic (e.g., hardware and firmware). Controller 108 can be included on the same physical device (e.g., the same die) as memories 110-1, 110-2, . . . , 110-N. For example, controller 108 can be an application specific integrated circuit (ASIC) coupled to a printed circuit board including physical host interface 106 and memories 110-1, 110-2, . . . , 110-N. Alternatively, controller 108 can be included on a separate physical device that is communicatively coupled to the physical device that includes memories 110-1, 110-2, . . . , 110-N. In a number of embodiments, components of controller 108 can be spread across multiple physical devices (e.g., some components on the same die as the memory, and some components on a different die, module, or board) as a distributed controller.

Controller 108 can communicate with memory devices 110-1, 110-2, . . . , 110-N to sense (e.g., read), program (e.g., write), and/or erase information, among other operations. Controller 108 can have circuitry that may be a number of integrated circuits and/or discrete components. In a number of embodiments, the circuitry in controller 108 may include control circuitry for controlling access across memory devices 110-1, 110-2, . . . , 110-N and/or circuitry for providing a translation layer (e.g., a flash translation layer) between host 102 and memory system 104.

Controller 108 can control operation of a dedicated region, such as a block addressing portion, of each respective memory device 110-1, 110-2, . . . , 110-N as a L2P data structure (e.g., configure a portion of each respective memory devices 110-1, . . . , 110-N to store one or more L2P data structures as described in more detail in connection with FIG. 2, herein). For example, a first portion of each respective memory device 110-1, 110-2, . . . , 110-N can be configured to store a first L2P data structure, and a second portion of each respective memory device 110-1, 110-2, . . . , 110-N can be configured to store a second L2P data structure.

The first portion of each respective memory device 110-1, 110-2, . . . , 110-N can be, for example, a first plurality of blocks (e.g., physical blocks) of memory cells in each respective memory, as will be further described herein (e.g., in connection with FIG. 1), and may be referred to herein as a first portion of the memory. In addition, portions of each respective memory device 110-1, 110-2, . . . , 110-N can include a second plurality of blocks, a third plurality of blocks, etc.

Figure 2:
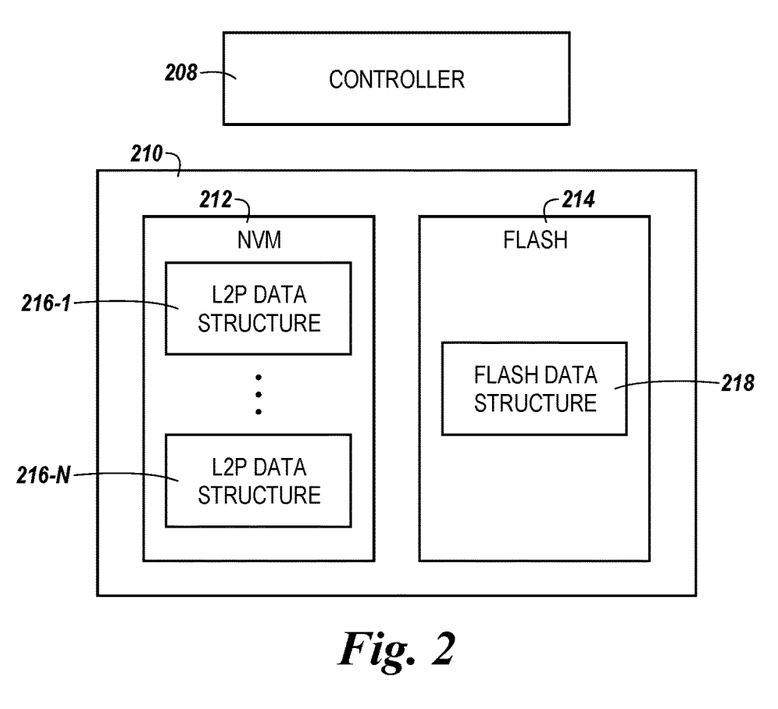
FIG. 2 is a block diagram of an apparatus in the form of a memory system in accordance with a number of embodiments of the present disclosure.

The second portion of each respective memory 110-1, 110-2, . . . , 110-N can be, for example, a second plurality of blocks (e.g., physical blocks) of memory cells in each respective memory, as will be further described herein (e.g., in connection with FIG. 2). Controller 108 can cause one or more L2P data structures (e.g., L2P data structures 216-1, . . . , 216-N illustrated in FIG. 2) to be stored in the respective memory devices 110-1, . . . , 110-N.

The embodiment illustrated in FIG. 1 can include additional circuitry, logic, and/or components not illustrated so as not to obscure embodiments of the present disclosure. For example, memory device 104 can include address circuitry to latch address signals provided over I/O connectors through I/O circuitry. Address signals can be received and decoded by a row decoders and column decoders, to access memories 110-1, 110-2, . . . , 110-N.

FIG. 2 is a block diagram of an apparatus in the form of a memory system in accordance with a number of embodiments of the present disclosure. As illustrated in FIG. 2, a controller 208 may be coupled to a memory device 210. The controller 208 may be analogous to controller 108 illustrated in FIG. 1, and the memory device 210 may be analogous to at least one of the memory devices 110-1, . . . , 110-N illustrated in FIG. 1. The memory device 210 may include a NVM device 212 and a flash memory device 214. The controller 208, memory device 210, NVM device 212 and/or the flash memory device 214 may separately be considered an "apparatus."

The NVM device 212 may include a plurality of L2P data structures 216-1, . . . , 216-N. Although shown in FIG. 2 as a plurality of L2P data structures 216-1, . . . , 216-N, in at least one embodiment, the NVM device 212 may include two distinct L2P data structures 216-1, . . . , 216-N; however, embodiments are not limited to two distinct L2P data structures 216-1, . . . , 216-N. For example, in at least one embodiment, the NVM device 212 may include a first L2P data structure (e.g., L2P data structure 216-1) and a second L2P data structure (e.g., L2P data structure 216-N). However, embodiments are not so limited, and the NVM device 212 may include more than two distinct L2P data structures 216-1, . . . , 216-N (e.g., three or more distinct L2P data structures).

The L2P data structures 216-1, . . . , 216-N may be configurable to store data corresponding to L2P addressing schemes. For example, the L2P data structures 216-1, . . . , 216-N may be configurable to store L2P addressing tables. In some embodiments, the L2P data structure 216-1 may be an a×b table (e.g., an a×b tensor or multi-dimensional array) and the L2P data structure 216-N may be an a×b table, where a and b are non-zero integers. Alternatively stated, in some embodiments, the L2P data structure 216-1 and the L2P data structure 216-N may include a same quantity of columns and a same quantity of rows (e.g., the L2P data structure 216-1 and the L2P data structure 216-N may be the same size). In some embodiments, the controller 208 may be configured to control storage in the L2P data structures 216-1, . . . , 216-N.

The L2P data structure 216-1 may be analogous to data structure A illustrated and described in more detail in connection with FIG. 3B, herein, and the L2P data structure 216-N may be analogous to data structure H illustrated and described in more detail in connection with FIG. 3C, herein. For example, the L2P data structure 216-1 may include logical block addresses (LBAs), while the L2P data structure 216-N may include physical block addresses (PBAs). The two L2P data structures 216-1 and 216-N illustrated in FIG. 2 may be related in the following manner: If a LBA is stored in an i-th position (e.g., location) in the L2P data structure 216-1, a corresponding PBA may be stored in an i-th position of the L2P data structure 216-N. In some embodiments, it may be possible to locate, write, and/or read an LBA stored in the L2P table 216-1 by executing a plurality of hash functions. In a non-limiting example, it may be possible to locate, write, and/or read an LBA stored in the L2P table 216-1 by executing two of hash functions, which are referred to herein as h and s.

The hash functions h and s may be functions of a LBA. For simplicity, the LBA may be referred to herein as l. Stated alternatively, a first hash function h may be referred to as h(l), and a second hash function may be referred to as s(l). In some embodiments, the first hash function h(l) may correspond to a hash address of a LBA, l, and the second hash function s(l) may correspond to a hash increment of the LBA, l, as described in more detail in connection with Equations 1-7, as well as Tables 1 and 2, herein.

In some embodiments, the hash functions h and s may be selected such that they are efficiently computable. As used herein, the term "efficiently computable" refers to functions that can be easily implemented in hardware. Moreover, the hash functions h and s may be selected to have a low collision probability. Here the term a "low collision probability" refers to functions that, upon receipt of different input values, are likely to output different hash values. For example, when h and s have a "low collision probability," each hash function, h(l) and s(l) will output different hash values upon execution when different LBAs (e.g., different values for l) are used as inputs to the hash functions, as described in more detail in connection with Table 1, herein.

In contrast to some approaches in which L2P data is stored in a multi-level tree structure, by using two L2P address tables (e.g., L2P data structure 216-1 and L2P data structure 216-N), the number of data structures (e.g., the level of trees used in some previous approaches) may be minimized even as the storage density of the memory device 210 is increased. For example, embodiments described herein in which two discrete L2P address tables (e.g., a first L2P data structure 216-1 and a second L2P data structure 216-N) are utilized may reduce the number of data structures (e.g., trees) used in some approaches as the storage density of the memory device 210 increases. However, as described above, embodiments are not limited to two discrete L2P address tables, and the present disclosure is intended to cover examples in which more than two discrete L2P address tables may be used in connection with storing and retrieving logical and physical block addresses.

By using two discrete L2P address tables (e.g., L2P data structure 216-1 and L2P data structure 216-N), it may be possible to write and/or read an LBA using only two operations. For example, in some embodiments, it may be possible to write an LBA using only two write operations by utilizing the hash functions h(l) and s(l). As an example, when the flash memory device 214 contains less than a threshold quantity of entries (e.g., when the flash memory device 214 is partially filled), embodiments herein allow for LBAs to be written to the L2P data structure 216-1 using only two write operations. In embodiments in which the flash memory device 214 contains more than a threshold quantity of entries, embodiments herein may allow for LBAs to be written to the L2P data structure 216-1 using only three write operations. Embodiments are not so limited; however, and in some embodiments, LBAs may be written to the L2P data structure 216-1 using more than three write operations based on the quantity of entries contained in the flash memory device 214.

In some embodiments, the L2P data structure 216-1 may be configured such that it is partially ordered, as described in more detail in connection with FIGS. 3A-3C, herein. As used herein, "partially ordered" refers to a condition in which the L2P data structure 216-1 reflects a binary relation between certain elements in the L2P data structure 216-1. For example, certain elements in the L2P data structure 216-1 may include an element that precedes another element in the L2P data structure in terms of ordering 216-1. However, not every element in the L2P data structure 216-1 need exhibit the property that an element precedes another element in terms of ordering, and the L2P data structure 216-1 may include pairs of elements for which neither element in the pair precedes the other element in the pair in terms of ordering. In some embodiments, the controller 208 may be configured to maintain the L2P data structure 216-1 such that the L2P data structure 216-1 is partially ordered. The condition that the L2P data structure 216-1 is partially ordered is discussed in more detail in connection with FIGS. 3A-3C, herein.

The flash memory device 214 may include a flash data structure 218. The flash data structure 218 may be configurable to store data corresponding to locations of PBAs and/or LBAs stored in the L2P data structures 216-1, . . . , 216-N, as described in more detail in connection with FIG. 3A, herein. In some embodiments, the controller 208 may be configured to control storage of the data corresponding to locations of PBAs and/or LBAs in the flash data structure 218.

As discussed above, the flash memory device 214 may include one or more portions of electronic (e.g., solid state) non-volatile memory storage. For example, the flash memory device 214 may include one or more portions of NAND flash memory, NOR flash memory, NVRAM flash memory, etc. The flash memory device 214 may be configured to be written to (or read) in blocks (or pages), which may be smaller than an amount of storage space available to the entire flash memory device 214. However, in some embodiments, the flash memory device 214 may be written to, or read from, on a byte-by-byte basis (e.g., locations of the flash memory device 214 may be written to or read independently).

In some embodiments, as shown in Equation 1, the hash functions h(l) and s(l) may be defined that, for a quantity n of LBAS (where 0≤n≤n−1) and, for a quantity m of PBAs (where m>n)

$$\begin{cases} 0 \le h(l) < m \\ 1 \le s(l) < m \end{cases} \quad \text{(Equation 1)}$$

In Equation 1, the hash function s(l) may be chosen such that s(l) is relatively prime to m. As used herein, the term "relatively prime" (or "coprime") describes two integers such that there is no integer greater than unity that divides both the integers. For example, the integers 12 and 13 are relatively prime because there is no integer greater than unity that divides both 12 and 13. In contrast, the integers 12 and 14 are not relatively prime because there exists an integer greater than unity (e.g., 2) that divides both 12 and 14.

Figure 3A:
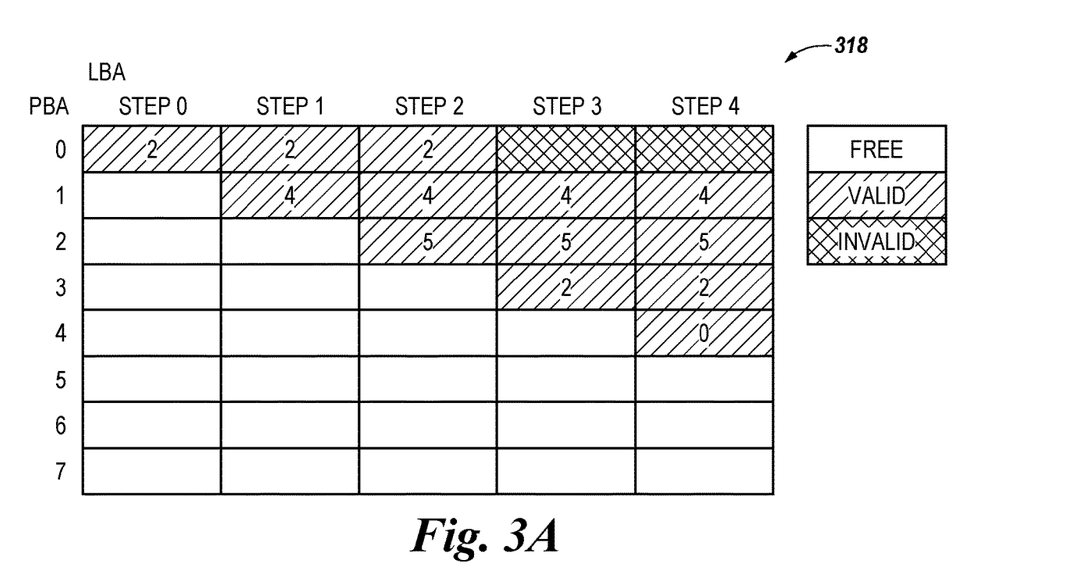
FIG. 3A is a block diagram of a flash data structure in accordance with a number of embodiments of the present disclosure.
Figure 3B:
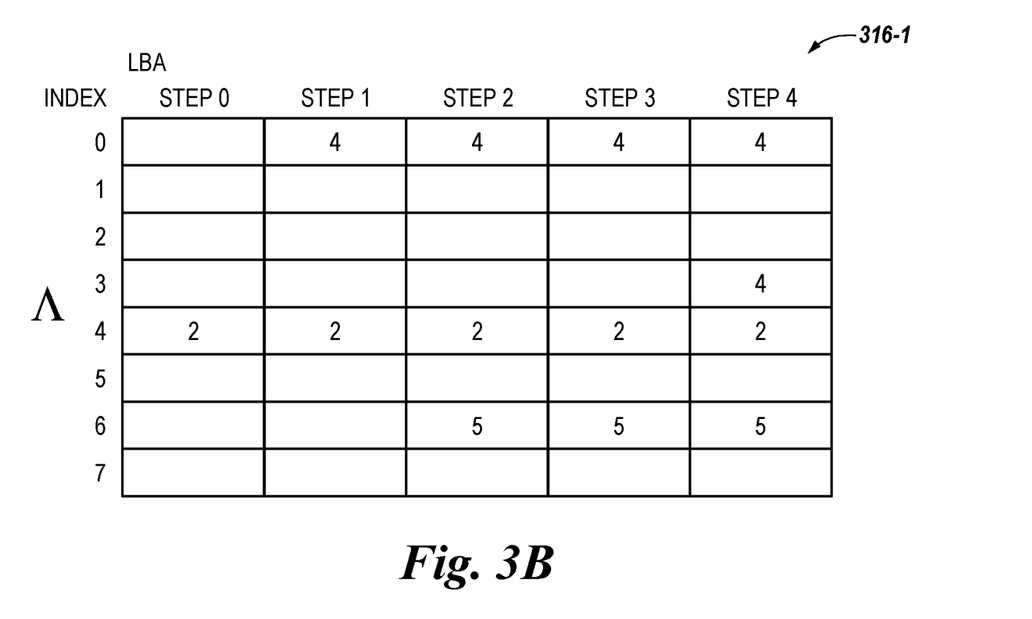
FIG. 3B is a block diagram of an example logical-to-physical data structure in accordance with a number of embodiments of the present disclosure.

In some embodiments, by choosing s(l) such that it is relatively prime to m, it may be possible to examine each and every distinct position in an LBA structure Λ (e.g., LBA data table Λ 316-1 illustrated in FIG. 3B, herein).

As shown in Equation 2, the L2P data structure 216-1 (e.g., LBA data table Λ 316-1 illustrated in FIG. 3B) and the L2P data structure 216-N (e.g., PBA data table Π 316-1 illustrated in FIG. 3B) may include m elements. For example, the L2P data structure 216-1 and the L2P data structure 216-N may be configured such that there is one element m for each PBA.

$$\begin{cases} \Lambda = \Lambda_0, \ldots, \Lambda_{m-1} \\ \Pi = \Pi_0, \ldots, \Pi_{m-1} \end{cases} \quad \text{(Equation 2)}$$

In some embodiments, the L2P data structure 216-1 and the L2P data structure 216-N may be empty. For example, at some period in time, the L2P data structure 216-1 and the L2P data structure 216-N may contain no data (e.g., L2P data structure 216-1 may contain no LBAs and L2P data structure 216-N may contain no PBAs), as shown by Equation 3:

$$\Lambda_i = \Pi_i = -1 \text{ for all } i \quad \text{(Equation 3)}$$

The host (e.g., host 102 illustrated in FIG. 1, herein) may write an LBA (l) to a location in the L2P data structure 216-1. In some embodiments, there may be a corresponding empty location in the L2P data structure 216-N in which a PBA (p) may be written. The location in the L2P data structure 216-1 to write the LBA may be determined using Equation 4:

$$i = h(l) \quad \text{(Equation 4)}$$

In some embodiments, if $\Lambda_i = -1$ as shown in Equation 3, the i-th location in the L2P data structure 216-1 is empty and values for the L2P data structure 216-1 and the L2P data structure 216-N may be set as shown in Equation 5:

$$\begin{cases} \Lambda_i = l \\ \Pi_i = p \end{cases} \quad \text{(Equation 5)}$$

In contrast, if the i-th location in the L2P is occupied, as shown in Equation 6, a collision may occur. As used herein, a "collision" is a scenario in which a location in the L2P data structure 216-1 determined by the hash function h(l) already contains a LBA different from l. When a collision is detected, a new LBA may not be written over the existing LBA in the L2P data structure 216-1. Instead, if a collision is detected, the second hash function s(l) may be used to determine a different location in the L2P data structure 216-1 to write the LBA.

$$\Lambda_i = l' \ne l \quad \text{(Equation 6)}$$

The writing of LBAs to the L2P data structure 216-1 and of PBAs to the L2P data structure 216-N is further described below in connection with FIGS. 3A-3C.

FIG. 3A is a block diagram of a flash data structure 218 in accordance with a number of embodiments of the present disclosure. The flash memory device may be analogous to flash memory device 214 illustrated in FIG. 2. As shown in FIG. 3A, the flash data structure 318 may include a plurality of locations (e.g., storage locations of a flash memory device such as flash memory device 214 illustrated in FIG. 2). Further, as shown in FIG. 3A, the flash data structure 318 shows a plurality of steps (e.g., STEP 0, . . . , STEP 4), which will be described by way of an example below. For example, FIG. 3A shows a status of the flash memory device at a plurality of steps.

In FIG. 3A, some of the locations may be free, valid, or invalid. These statuses may change as time increases and data is written to the flash memory device (e.g., as data is written to the flash memory data structure 318). As illustrated in FIG. 3A, locations that are free (e.g., locations that do not have corresponding data stored therein) are indicated as white boxes. Locations that contains valid data (e.g., a latest version of the content associated to a given LBA) are indicated with a single hashing pattern, and locations that are invalid (e.g., locations containing data that are not valid any more for the host) are indicated by cross-hatching. For example, at STEP 0, the location corresponding to index 0 is valid because it contains the latest version of the data associated to LBA 2. In contrast, at STEP 3, the location corresponding to index 0 is invalid because the LBA 2 has been updated by the host, and the latest content is now in location 3.

FIG. 3B is a block diagram of an example L2P data structure in accordance with a number of embodiments of the present disclosure. The L2P data structure 316-1 illustrated in FIG. 3B may be analogous to L2P data structure 216-1 illustrated in FIG. 2. As shown in FIG. 3B, the L2P data structure 316-1 may include a plurality of locations (e.g., locations in a LBA table such as L2P data structure 216-1 illustrated in FIG. 2). Further, as shown in FIG. 3B, the L2P data structure 316-1 shows a plurality of steps (e.g., STEP 0, . . . , STEP 4), which will be described by way of an example below. For example, FIG. 3B shows the evolution of the L2P data structure 316-1 for a plurality of steps.

Figure 3C:
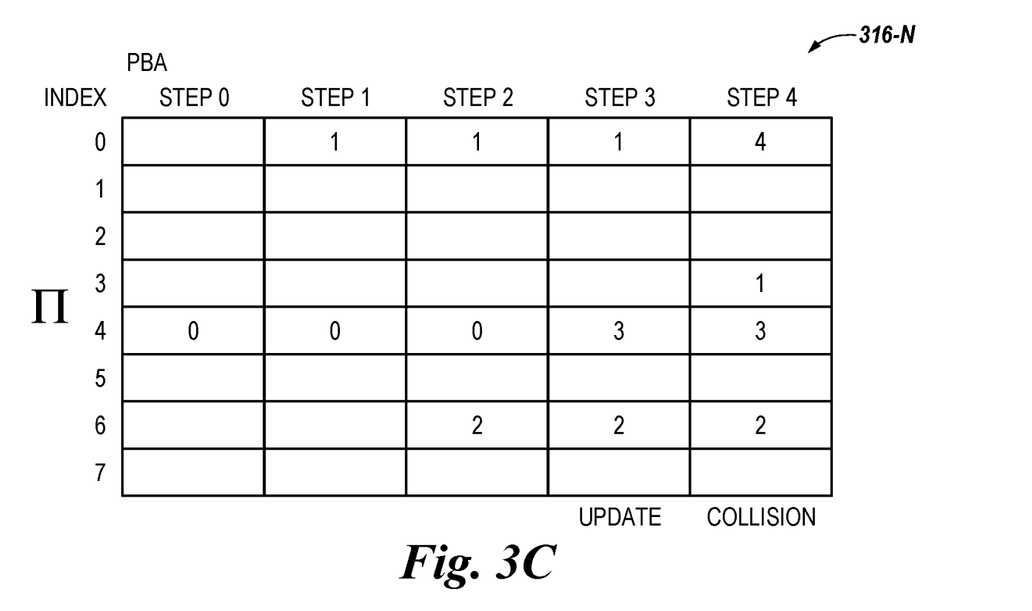
FIG. 3C is another block diagram of an example logical-to-physical data structure in accordance with a number of embodiments of the present disclosure.

FIG. 3C is another block diagram of an example L2P data structure in accordance with a number of embodiments of the present disclosure. The L2P data structure 316-N illustrated in FIG. 3C may be analogous to L2P data structure 216-N illustrated in FIG. 2. As shown in FIG. 3C, the L2P data structure 316-N may include a plurality of locations (e.g., locations in a LBA table such as L2P data structure 216-N illustrated in FIG. 2). Further, as shown in FIG. 3C, the L2P data structure 316-N shows a plurality of steps (e.g., STEP 0, . . . , STEP 4), which will be described by way of an example below. For example, FIG. 3C shows the evolution of the L2P data structure 316-N for a plurality of steps.

In the following non-limiting example, we assume that there are 8 PBAs (e.g., m=8) and 6 LBAs (e.g., n=6). An example of the two hashing functions h(l) and s(l) for this example are shown in Equation 7:

$$\begin{cases} h(l) \triangleq 6l \pmod 8 \\ s(l) \triangleq 3(h(l)+1) \pmod 8 \end{cases} \quad \text{(Equation 7)}$$

Although the modulo operation shown in Equation 7 shows a divisor of 8, embodiments are not so limited, and h(l) and s(l) shown in Equation 7 may have divisors different than 8. For example, a divisor of x, where x is an integer may be used in place of 8 in Equation7. The values generated by the two hashing functions h(l) and s(l) for the example in which m=8 and n=6 are shown in Table 1:

TABLE 1

| LBA l | h(l) | s(l) |
|---|---|---|
| 0 | 0 | 3 |
| 1 | 6 | 5 |
| 2 | 4 | 7 |
| 3 | 2 | 1 |
| 4 | 0 | 3 |
| 5 | 6 | 5 |

Continuing with this example, the host (e.g., host 102 illustrated in FIG. 1, herein) may write a sequence of LBAs to the memory device (e.g., memory device 210 illustrated in FIG. 2, herein). In some embodiments, the sequence of LBAs may be written in a sequence of steps (e.g., SETP 0, . . . , STEP 4 shown in FIGS. 3A-3C). An example sequence of LBAs may be the following sequence of LBAs shown in Table 2:

TABLE 2

| STEP 0 | STEP 1 | STEP 2 | STEP 3 | STEP 4 |
|---|---|---|---|---|
| 2 | 4 | 5 | 2 | 0 |

At STEP 0 shown in FIGS. 3A-3C, the host may attempt to write an LBA with a corresponding value of 2 (as shown in Table 2). Since this is the first attempt by the host to write an LBA to the memory device, there is a free block in the L2P data structure 318-N corresponding to a free PBA block at 0. Using Equation 4, i=h(2)=4. Since $\Lambda_4$ is empty (e.g., there is no previously stored LBA in the location corresponding to $\Lambda_4$) the controller may cause $\Lambda_4=2$ and $\Pi_4=0$ to be set, as shown in FIGS. 3B and 3C. In addition, since the flash data structure 318 does not contain an entry at STEP 0, the LBA value of 2 is written to the position in the flash data structure 318 corresponding to an index of 0 at STEP 0, as shown in FIG. 3A.

At STEP 1 shown in FIGS. 3A-3C, the host may attempt to write an LBA with a corresponding value of 4 (as shown in Table 2). As shown in FIG. 3C there is a free block in the L2P data structure 318-N corresponding to a free PBA block at 1. Using Equation 4, i=h(4)=0. Since $\Lambda_0$ is empty (e.g., there is no previously stored LBA in the location corresponding to $\Lambda_0$) the controller may cause $\Lambda_0=4$ and $\Pi_0=1$ to be set, as shown in FIGS. 3B and 3C. In addition, since the flash data structure 318 does not contain an entry at STEP 1, the LBA value of 4 is written to the position in the flash data structure 318 corresponding to an index of 1 at STEP 1, as shown in FIG. 3A.

At STEP 2 shown in FIGS. 3A-3C, the host may attempt to write an LBA with a corresponding value of 5 (as shown in Table 2). As shown in FIG. 3C there is a free block in the L2P data structure 318-N corresponding to a free PBA block at 2. Using Equation 4, i=h(5)=6. Since $\Lambda_6$ is empty (e.g., there is no previously stored LBA in the location corresponding to $\Lambda_6$) the controller may cause $\Lambda_6=6$ and $\Pi_6=2$ to be set, as shown in FIGS. 3B and 3C. In addition, since the flash data structure 318 does not contain an entry at STEP 2, the LBA value of 5 is written to the position in the flash data structure 318 corresponding to an index of 2 at STEP 2, as shown in FIG. 3A.

At STEP 3 shown in FIGS. 3A-3C, the host may attempt to update the content of the LBA with a corresponding value of 2 (as shown in Table 2). As shown in FIG. 3C there is a free block in the L2P data structure 318-N corresponding to a free PBA block at 3. Using Equation 4, i=h(2)=4. Since $\Lambda_4=2$, the correct LBA value (e.g., a value of 2) is stored in the location corresponding to $\Lambda_4=2$. In this case, it may be possible to update the PBA to correspond to the free block at index 4 in FIG. 3C. For example, in some embodiments, the controller may cause $\Lambda_4=2$ and $\Pi_4=3$ to be set, as shown in FIGS. 3B and 3C. In this example, the content of the PBA corresponding to PBA block 3 is now valid. In addition, since the flash data structure 318 does not contain an entry at STEP 3, the LBA value of 2 is written to the position in the flash data structure 318 corresponding to an index of 3 at STEP 3, as shown in FIG. 3A.

At STEP 4 shown in FIGS. 3A-3C, the host may attempt to write the content of the LBA with a corresponding value of 0 (as shown in Table 2). As shown in FIG. 3C there is a free block in the L2P data structure 318-N corresponding to a free PBA block at 4. Using Equation 4, i=h(0)=0. Since $\Lambda_0=4$, a collision may occur. In some embodiments, when a collision occurs, the controller may be configured to maintain conflicting LBAs in a particular order (e.g., the controller may be configured to maintain the L2P data structure 318-1 such that it is partially ordered). For example, when a collision occurs, the controller may be configured to maintain conflicting LBAs in the L2P data structure 318-1 in an ascending order.

Following with the example, the LBA stored in $\Lambda_0=4$, which is a larger value than the new LBA 0 (from Table 2 at STEP 4). As a result, the controller may cause $\Lambda_0$ to be set to 0 and the PBA to be set to 1. As a result, the controller may cause $\Lambda_0=0$ and $\Pi_0=0$ to be set, and a new location for the LBA 4 and PBA 1 to be located. In some embodiments, the new location may be determined using the second hash function s(l). Using s(l) from Equation 7, s(4)=3, so, i+s(4)=0+3=0. As a result, the controller may be configured to cause $\Lambda_3=4$ and $\Pi_3=1$, as shown in FIGS. 3B and 3C.

The example described above in connection with FIGS. 3A-3C is further summarized more generally below with the following examples of pseudocode. In the following pseudocode examples, at the outset, the L2P data structures 318-1 and 318-N are empty and are initialized by setting $\Lambda_i=\Pi_i=-1$ for all i∈{0, . . . , m-1}, as shown in Equation 3. The first example pseudocode illustrates an example of writing and/or updating an LBA l in accordance with a number of embodiments of the present disclosure:

```
procedure Insert(LBA l, free PBA p)
    Set i ← h(l)
    Set completed ← False
    while Not completed do
        if Λ_i = -1 then
```

```
        Set Λ_i ← 1
        Set Π_i ← p
        Set completed ← True
    else if Λ_i = 1 then
        Set Π_i ← p
        Set completed ← True
    else if Λ_i > 1 then
        Set l' ← Λ_i
        Setp p' ← Π_i
        Set Λ_i ← 1
        Set Π_i ← p
        Set l ← l'
        Set p ← p'
    end if
    Set i ← 1 + s(l) (mod m)
    end while
end procedure
```

1:
2:
3:
4:
5:
6:
7:
8:
9:
10:
11:
12:
13:
14:
15:
16:
17:
18:
19:
20:
21:
22:

In the first operation of the first example pseudocode, a procedure to write (e.g., to insert) an LBA l having a corresponding PBAp may be initialized. In some embodiments, the second operation may include setting the first has function h(l) to i, as described in connection with Equation 4. The third operation may include setting an indication that the set has not completed to false, thereby indicating that the procedure is to continue at the fourth operation.

The fourth operation may include performing a while loop when the set is not completed, as described in the fifth through twenty-first operations. In some embodiments, the fifth operation may include determining that $\Lambda_i$ is equal to −1, as shown in Equation 3. If $\Lambda_i$ is equal to −1, the procedure may continue with the sixth operation in which $\Lambda_i$ is set to l, as shown in Equation 5. In the seventh operation, $\Pi_i$ may be set to p, as shown in Equation 5. If $\Lambda_i$ is set to l and $\Pi_i$ may be set to p, the if loop initiated at the fifth operation is completed, as shown in the eighth operation.

At the ninth operation, an else if then loop may be initiated in response to a determination that $\Lambda_i$ is equal to l, as shown in Equation 5. If $\Lambda_i$ is equal to l, in the tenth operation $\Pi_i$ may be set to p, as shown in Equation 5. In some embodiments, once the determination is made that $\Pi_i$ is equal to l and $\Pi_i$ is set to p, at the eleventh operation, the set may be completed. The ninth through eleventh operations may, in some embodiments, correspond to an update to the L2P data structures 318-1 and 318-N, as described above in connection with STEP 3 in FIGS. 3A-3C.

At the twelfth operation, a second else if then loop may be initiated in response to a determination that $\Lambda_i>1$. In response to the determination that $\Lambda_i>1$, at the thirteenth operation, the controller may cause $\Lambda_i$ to be set to l', as shown in Equation 6. In some embodiments, l' may correspond to a second location in the L2P data structure 318-1. At the fourteenth operation, $\Pi_i$ may be set to p', which may correspond to a second location in the L2P data structure 318-N.

Since the LBA l has greater value than an LBA previously stored in the first location of the L2P data structure 318-1, at the fifteenth operation, $\Lambda_i$ may be set to l. Similarly, at the sixteenth operation, $\Pi_i$ may be set to p. At the seventeenth operation, l' may be set to l, and at the eighteenth operation, p' may be set top. Finally, at the nineteenth operation, the if loop may be ended. The eleventh through nineteenth operations may, in some embodiments, correspond to detection of a collision occurring in the L2P data structures 318-1 and 318-N, as described above in connection with STEP 4 in FIGS. 3A-3C.

In response to completion of the nineteenth operation, i may be set to i+s(l) (mod m) to increment the first hash function by using the second hash function, as described in connection with FIGS. 3A-3C above. Subsequently, the while loop may be terminated at the twentieth operation, and the procedure may ended at the twenty-first operation.

The second example pseudocode illustrates an example of reading a PBA p corresponding to an LBA l in accordance with a number of embodiments of the present disclosure. In the second example pseudocode, if the LBA is written (e.g., stored) in the L2P data structure 318-1, a PBA value of −1 is returned:

```
procedure Find(LBA l)
    Set i ← h(l)
    Set completed ← False
    while Not completed do
        if Λ_i = l then
            Set p ← Π_i
            Set completed ← True
        else if Λ_i = −1 or Λ_i > l then
            Set p ← Π_i
            Set completed ← True
        end if
        Set i ← i + s(l) (mod m)
    end while
    return p
end procedure
```

1:
2:
3:
4:
5:
6:
7:
8:
9:
10:
11:
12:
13:
14:
15:

In the first operation of the second example pseudocode, a procedure to read (e.g., to retrieve) a PBA p associated with a corresponding LBA 1 may be initialized. In some embodiments, the second operation may include setting h(l) to i, as shown in Equation 4. If the set is not completed at the third operation, a while loop may be executed at the fourth operation.

The while loop may include an if then loop at the fifth operation. For example, at the fifth operation, if $\Lambda_i=1$, then at the sixth operation $\Pi_i$ may be set to p. This corresponds to a location in the L2P data structure 318-1 containing a corresponding entry in the L2P data structure 318-N. At the seventh operation, the set may be completed and the if then loop executed at the fifth operation may be terminated.

If the if then loop executed at the fifth operation is not completed, at the eight operation an else if then loop may be executed in response to a determination that $\Lambda_i$ is either −1 or if $\Lambda_i>1$. In this case, at the ninth operation, p may be set to −1 and the else if then loop executed at the eight operation may be terminated at the tenth operation.

At the eleventh operation, the if loop executed at the fifth operation may be terminated and, at the twelfth operation, i may be set to i+s(l) (mod m) to increment the first hash function by using the second hash function, as described in connection with FIGS. 3A-3C above. At the thirteenth operation, the while loop executed at the fourth operation may be terminated and the PBAp may be returned at the fourteenth operation. Finally, at the fifteenth operation, the procedure may be ended.

Figure 4:
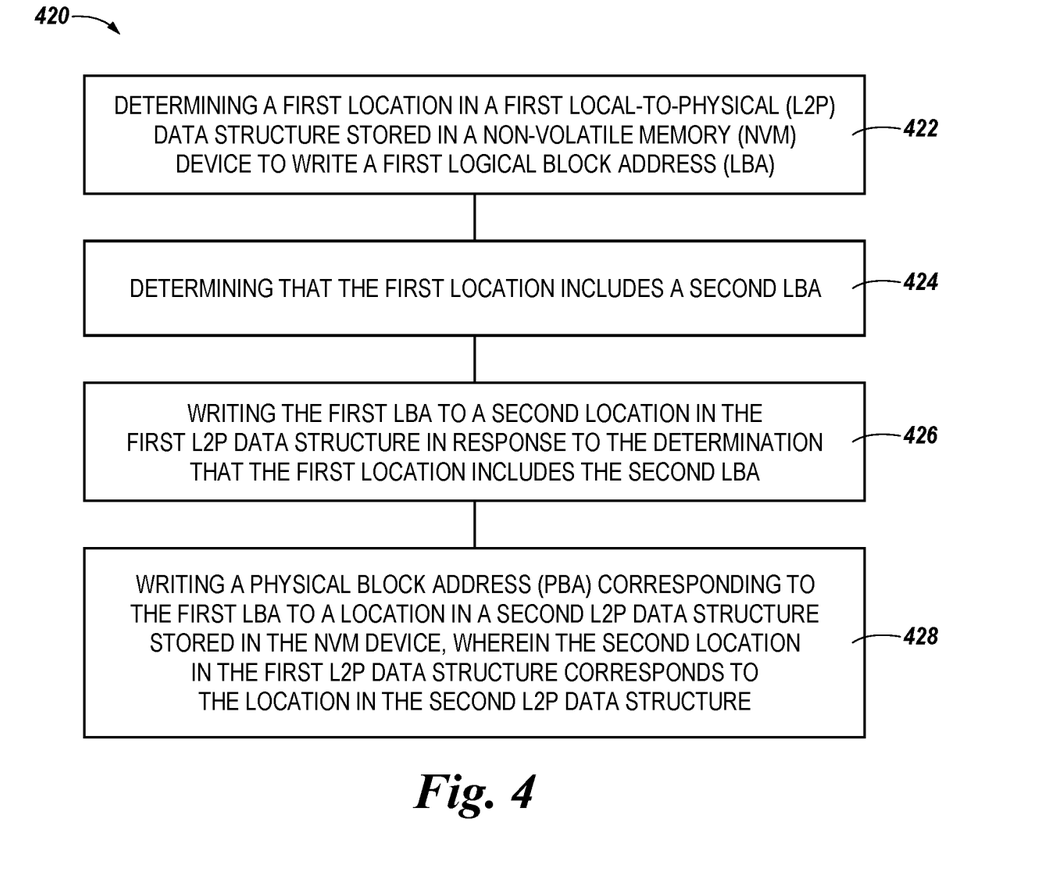
FIG. 4 illustrates an example flow diagram for logical-to-physical data structures in accordance with a number of embodiments of the present disclosure.

FIG. 4 illustrates an example flow diagram for logical-to-physical data structures in accordance with a number of embodiments of the present disclosure. At block 422 the method 420 may include determining a first location in a first logical-to-physical (L2P) data structure (e.g., L2P data structure 216-1 illustrated in FIG. 2, herein) stored in a non-volatile memory device to write a first logical block address (LBA). In some embodiments, the method 420 may include determining a first location in the first L2P data structure to write a first LBA by executing a first hash function h(l), as described in connection with FIGS. 3A-3C, herein.

At block 424, the method 420 may include determining that the first location includes a second LBA. In some embodiments, determining that the first location includes a second LBA may include determining that a collision has occurred at the first location. The second LBA may have been previously stored in the first location (e.g., the second LBA may have been stored in the first location prior to an attempt to store the first LBA in the first location). In some embodiments, the method 420 may include determining a first location in the first L2P data structure to write a first LBA by executing a second hash function s(l), as described in connection with FIGS. 3A-3C, herein.

At block 426, the method 420 may include writing the first LBA to a second location in the first L2P data structure in response to the determination that the first location includes the second LBA. For example, the method 420 may include writing the first LBA to a second location in the first L2P data structure in response to a determination that a collision has occurred.

At block 428, the method 420 may include writing a physical block address (PBA) corresponding to the first LBA to a first location in a second L2P data structure (e.g., L2P data structure 216-N illustrated in FIG. 2, herein) stored in the NVM device. In some embodiments, the second location in the first L2P data structure may correspond to the first location in the second L2P data structure.

As described above, the first L2P data structure and the second L2P data structure may contain a same quantity of rows and a same quantity of columns (e.g., the first L2P data structure may be an a×b table and the second L2P data structure may be an a×b table, where a and b are non-zero integers). For example, in some embodiments, the fist L2P data structure and the second L2P data structure may be of a same size.

In some embodiments, the method 420 may further include reading the first LBA from the second location in the first L2P data structure. Embodiments are not so limited, however, and in some embodiments, such as embodiments where the is not a collision detected and the first LBA is written to the first location in the L2P data structure, the method may further include reading the LBA from the first location in the first L2P data structure.

In some embodiments, the method 420 may further include reading the PBA from the second location in the second L2P data structure. For example, if a collision is detected and the PBA is written to a second location in the second L2P data structure, the method 420 may include reading the PBA from the second location in the second L2P data structure. Embodiments are not so limited, however, and in some embodiments, such as embodiments where there is not a collision detected and the PBA is written to a first location in the second L2P data structure, the method may further include reading the PBA from a first location in the second L2P data structure.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:
1. An apparatus, comprising:
a controller coupled to a flash memory device and an emerging memory technology non-volatile memory (NVM) device, wherein the controller is configured to cause:
a logical block address (LBA) to be written in a first logical-to-physical (L2P) data structure in the emerging memory technology NVM device:
using a first quantity of write operations based on the flash memory device containing less than a threshold quantity of entries, or using a second quantity of write operations based on the flash memory device containing greater than the threshold quantity of entries; and a physical block address (PBA) to be written in a second L2P data structure in the emerging memory technology NVM device, wherein the first L2P data structure and the second L2P data structure have a same size associated therewith.

2. The apparatus of claim 1, wherein the controller is further configured to cause the LBA to be written into the first L2P data structure based, at least in part, on execution of a first hash function.

3. The apparatus of claim 1, wherein the controller is further configured to cause:

the LBA to be written into a first position of the first L2P data structure based, at least in part, on execution of a first hash function; and the LBA to be written into a second position of the first L2P data structure based, at least in part, on a determination that execution of the first hash function yields a collision.

4. The apparatus of claim 3, wherein the controller is further configured to cause a determination that execution of the first hash function yields a collision based, at least in part, on a determination that the first position of the first L2P data structure contains a different LBA than the LBA to be written into the first position.

5. The apparatus of claim 3, wherein the controller is further configured to cause the LBA to be written into the second position of the first L2P data structure based, at least in part, on execution of a second hash function.

6. The apparatus of claim 1, wherein the controller is further configured to cause:

the LBA to be read from a first position of the first L2P data structure based, at least in part, on execution of a first hash function; and the LBA to be read from a second position of the first L2P data structure based, at least in part, on a determination that execution of the first hash function yields a collision, wherein the second position of the first L2P data structure is determined based, at least in part, on execution of a second hash function.

7. The apparatus of claim 1, wherein a particular position of the first L2P data structure corresponds to a corresponding particular position of the second L2P data structure.

8. The apparatus of claim 1, wherein the controller is further configured to cause the first L2P data structure to be partially ordered.

9. The apparatus of claim 1, wherein the controller is further configured to cause a logical block address corresponding to the LBA in the first L2P data structure to be written to the flash memory device.

10. A method, comprising:

determining, based on a quantity of entries in a flash memory device, a quantity of write operations to be performed to write a first logical block address (LBA) to a first logical-to-physical (L2P) data structure in a non-volatile memory (NVM) device coupled to the flash memory device;

determining a first location in the first L2P data structure stored in the NVM device to write the first LBA;

determining that the first location includes a second LBA;

writing the first LBA to a second location in the first L2P data structure in response to the determination that the first location includes the second LBA; and writing a physical block address (PBA) corresponding to the first LBA to a location in a second L2P data structure stored in the NVM device, wherein the second location in the first L2P data structure corresponds to the location in the second L2P data structure.

11. The method of claim 10, wherein the first L2P data structure and the second L2P data structure have a same quantity of rows and a same quantity of columns associated therewith.

12. The method of claim 10, wherein the first location in the first L2P data structure is determined by executing a first hash function corresponding to the first LBA, and wherein second location in the first L2P data structure is determined by executing a second hash function corresponding to the first LBA to increment the first location of the first L2P data structure to the second location of the first L2P data structure.

13. The method of claim 10, further comprising reading the first LBA from the second location in the first L2P data structure.

14. The method of claim 10, further comprising reading the first PBA from the location in the second L2P data structure.

15. The method of claim 10, further comprising storing data corresponding at least one of the first LBA and the PBA in a flash memory device coupled to the NVM device.

16. A system, comprising:

a non-volatile memory (NVM) device comprising a first logical-to-physical (L2P) data structure and a second L2P data structure, wherein the first L2P data structure and the second L2P data structure have a same size associated therewith;

a flash memory device coupled to the NVM device; and a controller coupled to the NVM device and the flash memory device, wherein the controller is to:

write, using a first quantity of write operations based on the flash memory device containing less than a threshold quantity of entries, or using a second quantity of write operations based on the flash memory device containing greater than the threshold quantity of entries, a logical block address (LBA) to the first L2P data structure in the NVM device; and write a physical block address (PBA) to the second L2P data structure in the NVM device.

17. The system of claim 16, wherein the controller is to cause:

write the LBA into a first position of the first L2P data structure based, at least in part, on execution of a first hash function; and write the LBA into a second position of the first L2P data structure based, at least in part, on a determination that execution of the first hash function yields a collision.

18. The system of claim 16, wherein the controller is to:

cause a determination that execution of the first hash function yields a collision based, at least in part, on a determination that the first position of the first L2P data structure contains a different LBA than the LBA to be written into the first position; and cause the LBA to be written into the second position of the first L2P data structure based, at least in part, on execution of a second hash function.

19. The system of claim 16, wherein a particular position of the first L2P data structure corresponds to a corresponding particular position of the second L2P data structure.

20. The system of claim 16, wherein the controller is to cause the first L2P data structure to be partially ordered.

* * * * *